United States Patent [19]

Tomoyasu et al.

[11] Patent Number: 5,202,157
[45] Date of Patent: Apr. 13, 1993

[54] METHOD FOR LINING INTERNAL SURFACES OF PIPELINES

[75] Inventors: Takaharu Tomoyasu; Kanji Miyamoto, both of Ichihara, Japan

[73] Assignee: Mitsui Petrochemical Industries, Ltd., Tokyo, Japan

[21] Appl. No.: 749,336

[22] Filed: Aug. 23, 1991

[30] Foreign Application Priority Data

Aug. 28, 1990 [JP] Japan ................... 2-226092

[51] Int. Cl.$^5$ ............... B05G 13/00; B41N 1/24; B05D 7/22
[52] U.S. Cl. .................. 427/142; 134/22.11; 156/94; 427/238; 427/239
[58] Field of Search ............ 134/22.11; 427/230, 427/238, 239, 142; 156/94

[56] References Cited

U.S. PATENT DOCUMENTS

| 3,277,508 | 10/1966 | Knapp | 15/104.061 |
| 4,083,076 | 4/1978 | Girard | 15/104.001 |
| 4,419,163 | 12/1983 | Yamamoto et al. | 427/238 X |
| 5,032,185 | 7/1991 | Knapp | 134/22.11 |
| 5,089,297 | 2/1992 | Koga et al. | 427/238 X |

FOREIGN PATENT DOCUMENTS

| 61-271070 | 12/1986 | Japan . |
| 62-23483 | 1/1987 | Japan . |
| 62-266178 | 11/1987 | Japan . |
| 63-59376 | 3/1988 | Japan . |
| 1-304086 | 12/1989 | Japan . |
| 2-68177 | 3/1990 | Japan . |
| 2114255 | 8/1983 | United Kingdom . |

Primary Examiner—Michael Lusigan
Attorney, Agent, or Firm—Birch, Stewart, Kolasch & Birch

[57] ABSTRACT

The present invention relates to an improvement in a lining method for internal surfaces of pipes in multi-branched pipings such as water pipes, gas pipes, etc. in which a plurality of branched pipelines are branched from a main pipeline, and particularly to a shaping method for a lining surface.

In a multi-branched piping in which a plurality of branched pipelines are branched from a main pipeline, a coating is poured into a pipeline from one end of a main pipeline or each of the branched pipelines, gas is then fed to thereby line the internal surface of the pipeline, a sponge consisting of an elastic foam body having a larger diameter than the inside diameter of the pipe constituting the pipeline, said foam body being made of synthetic resin and having a continuous foam, is inserted from an end of each branched pipeline, and the sponge is then pushed with the aid of air pressure whereby the lining surface can be shaped to have substantially uniform film thickness.

11 Claims, 3 Drawing Sheets

METHOD FOR LINING INTERNAL SURFACES OF PIPELINES

BACKGROUND OF THE INVENTION

The present invention relates to an improvement in a method for lining internal surfaces of pipelines for various pipings, such as water pipes and gas pipes, in which a plurality of branched pipelines branch from a main pipeline. Moreover, the present invention relates particularly to a shaping method for lining such internal surfaces.

In the past, a method involving blowing a coating composition into a pipeline with the aid of an air current to effect lining has been widely used for renewal of water pipes and gas pipes, as disclosed, for example, in Japanese Patent Laid-open Publication No. 2(1990)-68177.

According to the aforesaid technique, if the viscosity of the coating composition and air speed are properly selected and a coating having an excellent run characteristics is used, excellent lining can be carried out.

However, this method involves a problem which is difficult to solve in that the film thickness of the lining on the back surface of an elbow tends to become thin.

This problem occurs due to the fact that when an air current impinges upon the back of an elbow and then changes its direction, the action for forcibly spreading a film is quite strong. Thus, it is difficult to secure a film thickness of practical requirements under the air flow velocity required for an air flow method.

This method sometimes involves a further problem in that if coating conditions such as flow velocity are mistaken, the coated film becomes too thick or too thin.

As methods for solving these problems, a method has been carried out to smooth the coated film and correct its thickness through the use of a shaping pig before the coating is cured (For example, Japanese Patent Laid-open Publication Nos. 62(1987)-266178 and 63(1988)-274474).

However, the pig used in the conventional method is so high in density that when it is strongly compressed, the force for pressing the inner wall of the pipe becomes excessively strong and scrapes off the coated film. Therefore, a ball-like pig, which is somewhat smaller than, or one-size smaller than, the inside diameter of the pipe has been used. Accordingly, in this method, the pig is of the size adjusted by the minimum size of pipes used in the piping. Therefore, where pipe sizes are different, there is a problem in that a sufficient effect cannot be obtained for pipe portions whose size is large. Moreover, since the pig is moved from the side of a main pipeline whose size is large to the side of a branched pipeline whose size is small, in branched portions, the pig does not enter the branched pipeline but tends to move straight ahead along a main pipeline portion.

As measures for solving this problem, Japanese Patent Laid-open Publication No. 1(1989)-304086 proposes a method in which a pig is introduced into a branched pipeline with the aid of air also from the side opposite to a main pipeline (See FIG. 4, numeral 1 denotes a main pipe, and 1A denotes a branched pipe).

However, also in this case, the pig is moved from a main pipeline toward a branched pipeline. At the branched portion, even if a pig is pushed by an air current from the side opposite to the main pipeline, the pig as well as coatings accumulated in front of the pig do not enter the branched pipeline but tend to be transferred to the main pipeline on the opposite side. Since the pig is pushed by the air current from the side opposite to the main pipeline, the pig transferred to the opposite side is pushed back after all and moves to the branched pipeline. However, the coating having been pushed by the pig remains thick and hardens within the main pipeline. Thus, the object of shaping inner surfaces is not attained.

Furthermore, Japanese Patent Laid-open Publication No. 1(1989)-304086 discloses, instead of shaping a coated film subjected to lining by an air current method, a method for lining in which a coating is placed frontwardly of a pig, and the coating is pushed by air rearwardly of the pig. In this method, where the size of a branched pipeline is smaller than that of a main pipeline, the outside diameter of the pig is contracted due to compression.

However, the characteristics of the pig is not further defined, and therefore, there remains a question as to whether the necessary thickness of the coating is formed by a pig of reduced diameter.

SUMMARY OF THE INVENTION

An object of the present invention is to provide a method for lining internal surfaces of pipelines in which even the lining of an elbow portion of multi-branched pipings of different sizes can be shaped into a substantially uniform thin film, while solving the problems noted as with respect to the prior art.

The aforesaid object can be achieved by a lining method comprising, in a multi-branched piping in which a plurality of branched pipelines are branched from a main pipeline, pouring a coating into a pipeline from one end of a main pipeline or each of branched pipelines, feeding air therein to thereby line the internal surface of the pipeline, inserting therein a sponge consisting of an elastic foam body having a larger diameter than the inside diameter of the pipes constituting the pipeline, said foam body being made of a synthetic resin and having a continuous foam, and the pushing said sponge with the aid of air pressure.

As specific examples of the sponge made of synthetic resin used in the method according to this invention, there can be mentioned polyurethane foam, polyvinyl chloride foam, latex foam, silicone rubber foam, etc. Among these sponges, preferably sponges are those to which possess load-flexure characteristics, such that a load at flexure of 70% is 60 kg or less, preferably 10 to 60 kg, more preferably 20 to 40 kg, and a load at 70% of compression rate is 6.0 times of a load at 10% of compression rate or less, preferably 1.0 to 6.0 times, more preferably 1.0 to 3.0 times. Additionally, the sponges preferably are those which satisfy the conditions, in which where D is the diameter of sponge, $d_1$ is the minimum inside diameter of pipe and $d_2$ is the maximum inside diameter of pipe, in dimensions (and shapes), wherein for a columnar shape D is $1.0 \times d_2$ or more, preferably $1.0 \times d_2$ to $3.0 \times d_1$, more preferably $1.1 \times d_2$ to $2.0 \times d_1$, and length is $0.5 \times D$ to $3.0 \times D$, and for a sphere in which D is $1.1 \times d_2$ to $2.0 \times d_1$.

When these conditions are fulfilled, shaping of lining surfaces of internal surfaces of pipes different in diameter can be better carried out while the sponge is suitably deformed.

If the outside diameter of the sponge is columnar, molding of the sponge is also easy, and the sponge can be produced at less cost.

The synthetic resin foam constituting the aforesaid sponge is preferably of 10 to 70 kg/m³ or so in density in displaying the effect of the present invention.

When the sponge is satisfied with the condition in which in the load-flexure characteristics, a load at 70% of flexure is 60 kg or less, stress produced in a radial direction of the sponge is further small. When a load at 70% of compression rate is equal to or less than 6 times of a load at 10% of compression rate, a change of load resulting from deformation in said range is further less.

Thus, when the sponge possesses the aforementioned conditions, in shaping of the lining surface in the case where the diameter of the pipe is varied, i.e., large-diameter and small-diameter pipes the sponge can be deformed while being adjusted to the diameter of these pipes. In addition, since stress with respect to the pipe wall is not rapidly increased even if the diameter of the pipe is reduced. the lining surface of the entire pipe can be shaped more uniformly.

The load-flexure characteristics are measured in accordance with ASTM D3574 at a compression speed of 50 mm/min. using a 200 mm$\phi$-compressed plate and a sample of 50 mm×300 mm×300 mm in size.

According to the present invention, when a sponge is pressed by air pressure from an end of each branched pipeline, said air pressure may be varied according to diameters of pipes, dimensions and shapes of sponges, states of films, etc. Normally, the air pressure is 0.1 to 0.5 atmospheric pressure or so.

If this step is carried out in the procedure in which an inlet of a main pipeline is opened, and a small amount of backflow preventive air is fed from an end of the other branched pipeline to thereby guide a sponge to the inlet of the main pipeline, better results are obtained.

Accordingly, when the method of the present invention is carried out in accordance with said procedure using a sponge satisfied with the aforementioned characteristics and dimensional conditions, best results are obtained.

Coatings used in the method according to the present invention may be those used in the conventional lining method for internal surfaces of pipes. For example, an epoxy resin coating can be used.

In performing interior lining of pipes using such a coating, air is normally used as gas, but inert gases such as nitrogen can be also used. In this case, the pressure of a gas may be varied according to the inside diameter of pipes, length of pipes, etc. Generally, the pressure is 1.0 to 5.0 atmospheric pressure or so.

As described above, since the sponge of the present invention consists of a foam body having a continuous foam, a large amount of coatings can be contained therein. When the sponge is made to travel within the coated pipe before the coating is cured, the same state as that the interior of the pipe is coated with a so-called sponge brush results. That is, the excess amount of the coating on the pipe wall is sucked in by the sponge while an additional new coated film can be formed on a portion where the coated film is too thin.

Particularly in an elbow portion, when the sponge changes its direction, the sponge is strongly pressed against the pipe wall, and therefore, the coating compositional contained in the sponge is further extruded to form a thick film.

In the present invention, the sponge can be impregnated in advance with a coating for shaping if necessary. Also, the sponge can be pushed in after the shaping coating is put in advance into an end of a pipeline. In either case, the suitable amount of the shaping coating is equal to or less than the saturated amount by impregnation to the sponge. When the sponge possesses the aforementioned characteristics and dimensional conditions, the force of the sponge pushing the wall surface is substantially constant.

Accordingly, a lining surface can be shaped into a substantially uniform film thickness by the sponge, and the sponge will not scrape off a part of the lining surface.

The aforementioned fact has been confirmed by experiments as follows:

That is, two sponge-like elastic bodies are prepared (one has a continuous foam and capable of being impregnated with a coating composition, whereas the other has a discontinuous foam and not capable of being impregnated with a coating). One contains a coating while the other contains no coating. When in that state, the sponge is slid on the coating surface after coated while pressing it with the same compressive force, a film can be held in case of the former whilst a coating was scraped off in case of the latter.

This means that the principle of shaping a film according to the present invention is entirely different from the case of a shaping pig proposed in the conventional Japanese Patent Laid-open Publication Nos. 62(1987)-266178 and 63(1988)-274474.

That is, the conventional pig has no function to absorb coating but merely adjusts a clearance between the pig and the pipe wall to thereby shape a coated film, which the same as a rubber spatula in which a coated film is pressed spread to shape it.

When the sponge of the present invention is moved with the aid of air by a compressive force in the range of substantially constant after lining by way of an air current method as described above, a film surface is smoothly shaped to have a substantially constant thickness as mentioned above. It has been also found that in an elbow portion, a thicker film than that of the original can be formed on the back surface of the elbow by the passage of the sponge.

The range of 10% to 70% of strain of the sponge covers three sizes in terms of piping sizes according to JIS, for example. Therefore, it can be applied to the case such as a normal water piping in which a piping in the range of 15A to 25A and is extremely effective.

When the sponge is put in from an end of a branched pipeline and moved toward a main pipeline, the sponge is unavoidably turned in either left of right direction since ordinarily the branched pipeline is connected to the side of the main pipeline at a branched portion with respect to the main pipeline, and a minute air flow is merely from upstream and the sponge is positively transferred toward an opening portion of the main pipeline (See FIG. 2 numeral 1 designates a main pipe, and 1A is a branched pipe). Thereafter, the sponge will suffice to move straight ahead, and therefore, the sponge is positively guided to the opening portion of the main pipeline merely by introducing a small amount of anti-backflow air into a branched pipeline halfway.

As described above, according to the present invention, in a case where lining is applied to an inner surface of a multi-branched piping having branched pipes, a particularly elbow portion of a lining surface can be shaped into a substantially uniform thickness.

DESCRIPTION OF THE PREFERRED EMBODIMENTS OF THE INVENTION

An embodiment of the present invention will be described hereinafter with reference to the drawings.

Figure 3:
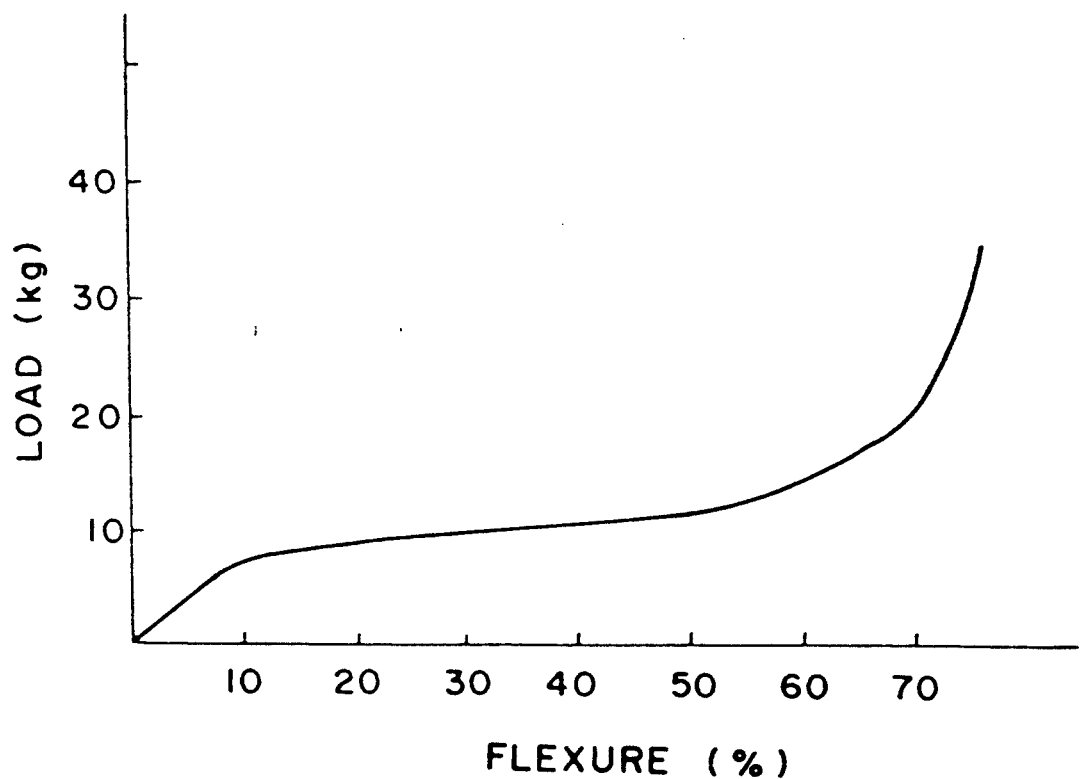
FIG. 3 is a view showing a load-flexure curve of a sponge according to the present invention.

First, a general load-flexure curve of an elastic foam material constituting a sponge used in the present embodiments is shown in FIG. 3. FIG. 3 shows a flexure amount by percentage obtained by compressing a plate having a diameter of 200 mm$\phi$ on a flexible polyurethane foam having a size of 300 mm (longitudinal)$\times$300 mm (lateral)$\times$50 mm (height) and applying a load thereon at a compression speed of 50 mm/min.

It is understood from FIG. 3 that the elastic foam material has characteristics that when the flexure amount is 10% or less, the load increases in proportion to the flexure amount; when the flexure amount exceeds 10%, a rate in increase of load up to 50% of flexure amount is very small; when the flexure amount exceeds 50%, a rate in increase of load up to 70% increases; when the flexure amount is about 70% or less, a rate in increase of load gradually increases; and when the flexure amount exceeds 70%, the load rapidly increases.

Figure 1:
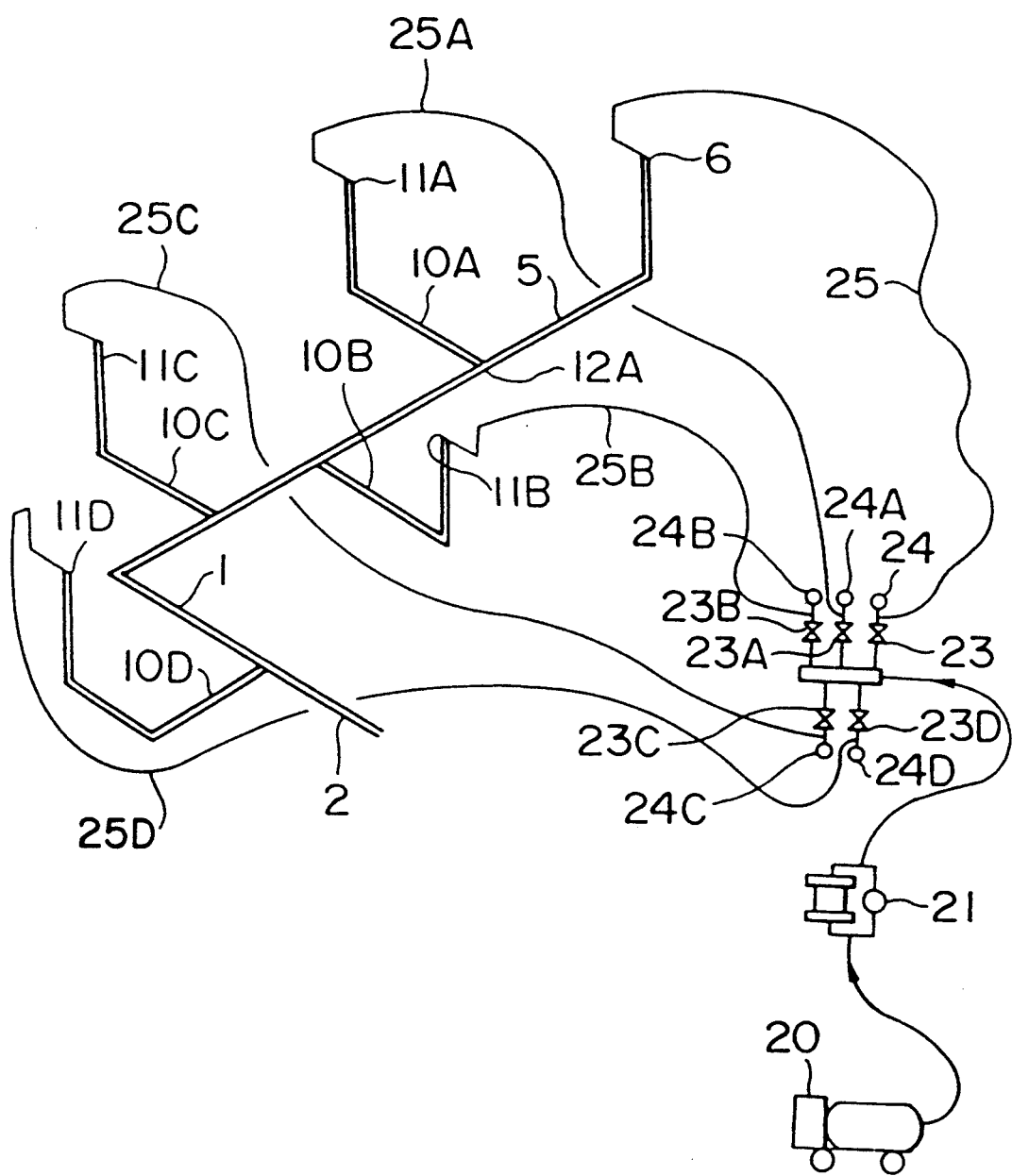
FIG. 1 is a schematic view showing an example in which the present invention is embodied to a piping assembled in accordance with water pipes in apartments.
Figure 2:
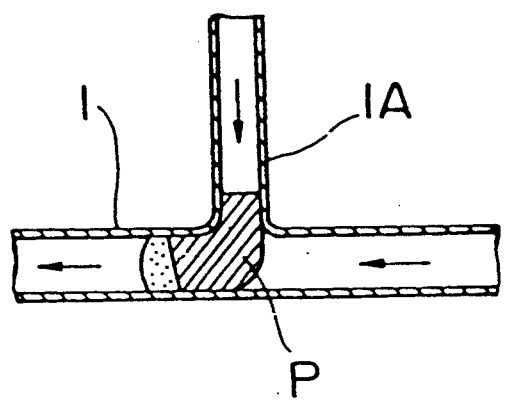
FIG. 2 is a view showing a method for moving a sponge from a branched pipeline to main pipeline.
Figure 4:
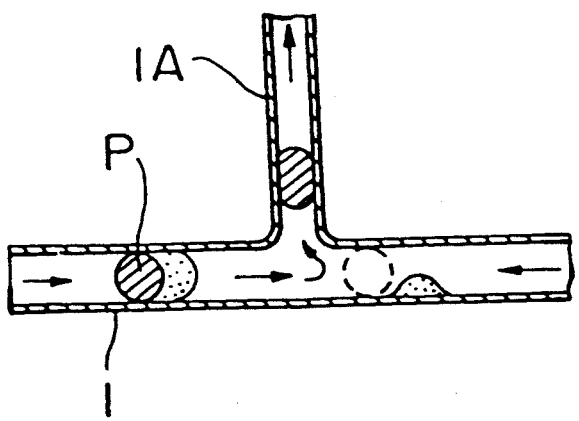
FIG. 4 is view showing a method for moving a sponges from a main pipeline to a branched pipeline.

Next, an embodiment of the method according to the present invention using the sponge as described above will be explained. FIG. 1 is an explanatory view of an embodiment in which the present invention is embodied to a piping assembled in accordance with a water pipe in apartment.

In FIG. 1, a main pipeline 1 for water pipes is provided at an end with a pipeline 5, and branched pipelines 10A, 10B, 10C and 10D are connected between the pipeline 5 and the other end 2 of the main pipeline 1.

In preparation for execution of lining, a water meter is removed from the other end 2 of the main pipeline 1; faucets are removed from one end 6 of the pipeline 5 and ends 11A to 11D of the branched pipelines 10A to 10D; connection pipes whose openings are directed upward are additionally connected to the one end 6 and the ends 11A to 11D; said opening is formed so that an air hose can be mounted to and removed therefrom; a pressure gage 24 and a valve 23 are connected to an air hose 25 connected to the one end 6 of the pipeline 5; pressure gages 24A to 24D and valves 23A to 23D are connected to air hoses 25A to 25D connected to the ends 11A to 11D of the branched pipelines 10A to 10D; and the valves 23, 23A to 23D are connected to an air compressor 20 through a flow meter 22 and a dehumidifier 21.

As for sizes of pipes, 2 to 12A of the main pipeline use 25A in nominal diameter of JIS; the branched pipelines 5 and 10A-10D use JIS 20A; and elbows different in diameter of JIS 15A are mounted at portions leading to the faucets.

In execution of lining, a necessary quantity of epoxy resin coating is poured into the ends of the pipeline 5 and 10A-10D using a measuring cup and applied toward the main pipeline. This coating method is in accordance with a method described in Japanese Patent Laid-open No. 2(1990)-68177.

Immediately after coating the whole pipeline, a columnar sponge of 30 mm in diameter and 50 mm in length made of flexible polyurethane foam of 20 kg/m$^3$ in density is inserted into a connection pipe which was used when the coating is poured into the end of the pipeline 5, and the hose 25 is connected.

In the sponge used, the load at 70% of flexure in the load-flexure characteristics was 25 kg, and the load at 70% of compression rate was 5 times of the load at 10% of compression rate.

The other end 2 of the main pipeline is opened, and a small amount of anti-backflow air (0.1 atmospheric pressure) is introduced into other branched pipelines 10A-10D by opening the valves 23A-23D. Then, when the valve 23 is slightly opened to feed air of 0.3 atmospheric pressure to the pipe 5, the sponge moves forward through the pipe and is discharged from the other end 2 of the main pipeline.

Subsequently, a sponge similar to the above is inserted into the connection pipe at the end 11A of the branched pipeline 10 and an anti-backflow air is introduced into other branched pipeline to feed the sponge in the same manner as above, which is then recovered from the other end 2 of the main pipeline.

Thereafter, the sponge is passed through all branched pipelines.

As the result, only by the air current method, there was a portion where a film thickness of the back surface of the elbow was less than 0.3 mm. On the other hand, by the use of the sponge, there can be secured 0.3 mm to 1.0 mm of a thickness of the back surface thereof of all elbows. It is to be noted that the film-thickness other than the elbows was 0.3 mm to 2.0 mm.

Furthermore, the movement of the sponge to the open portion 2 of the main pipeline was extremely smooth with no uneasy feeling at all.

An operation similar to the former was carried out by using s spherical sponge having a diameter of 30 mm (a load at 70% of flexure is 25 kg, and a load at 70% of compression rate is 5 times of a load at 10% of compression rate) made from flexible polyurethane foam in place of the columnar sponge. Good results similar to those of the present embodiment were obtained.

What is claimed is:

1. A method for lining an internal surface of a pipeline having a multi-branched piping in which a plurality of branched pipelines are branched from a main pipeline, which comprises the steps of:

pouring a coating composition into the pipeline from one end of a main pipeline or a branched pipeline;

feeding air into the pipeline in order to thereby line the internal surface of the pipeline with said coating composition;

inserting into the pipeline a columnar or spherical shaped synthetic resin-made sponge consisting of an elastic continuous foam body having a larger diameter than the inside diameter of the pipes constituting the pipeline and having a load-flexure characteristic such that a load at 70% of flexure is 60 kg or less, and a load at 70% of compression rate is 6 times or less than the load at 10% of compression rate, said columnar shape having dimensions such that D is $1.0\times d_2$ or more and length is $0.5\times D$ to $3.0\times D$ and said spherical shape having a dimension such that D is $1.1 \times d_2$ to $2.0 \times d_1$, wherein D is the diameter of the sponge, $d_1$ is the minimum inside diameter of pipe in said pipeline and $d_2$ is a maximum inside diameter of pipe in said pipeline; and pushing said sponge with the aid of air pressure to shape the lining surface.

2. A method according to claim 1, wherein said air pressure used in pushing said sponge is within the range of 0.1 to 0.5 atmospheres.

3. A method according to claim 1, wherein said sponge has a load-flexure characteristic such that a load at 70% of flexure is 10 to 60 kg, and a load at 70% of compression rate is 1.0 to 6.0 times that of a load at 10% of compression rate; and in case where the sponge is columnar, D is $1.0 \times d_2$ to $3.0 \times d_1$.

4. A method according to claim 1, wherein the density of the sponge is approximately 10 to 70 kg/m$^3$.

5. A method according to claim 1, 3 or 4, wherein the sponge is formed of flexible polyurethane foam, polyvinyl chloride foam, latex foam or silicone rubber foam.

6. A method according to claim 1, wherein the sponge is inserted into a branched pipeline and is pushed by air pressure from the end of the branched pipeline; and an inlet of the main pipeline is opened in order to feed a small amount of anti-backflow air from the ends of the other branched pipelines, thereby guiding the sponge to the inlet of the main pipeline.

7. A method according to claim 1, wherein the sponge is impregnated with a coating composition and then inserted into the end of the branched pipeline.

8. A method according to claim 1, wherein the sponge is inserted into the end of the branched pipeline after a shaping coating is poured into the end of said pipeline.

9. A method according to claim 1, wherein the sponge is formed of flexible polyurethane foam.

10. A method according to claim 6, wherein the step of inserting a sponge into an end of a branched pipeline is repeated, using a different branched pipeline end each time, until a sponge has passed through each branched pipeline.

11. A method according to claim 1, wherein said coating composition is an epoxy resin.

* * * * *